United States Patent
Wang et al.

(10) Patent No.: US 10,643,299 B2
(45) Date of Patent: May 5, 2020

(54) METHOD FOR ACCELERATING A CDVS EXTRACTION PROCESS BASED ON A GPGPU PLATFORM

(71) Applicant: PEKING UNIVERSITY SHENZHEN GRADUATE SCHOOL, Shenzhen (CN)

(72) Inventors: Ronggang Wang, Shenzhen (CN); Shen Zhang, Shenzhen (CN); Zhenyu Wang, Shenzhen (CN); Wen Gao, Shenzhen (CN)

(73) Assignee: PEKING UNIVERSITY SHENZHEN GRADUATE SCHOOL, Shenzhen (CN)

( * ) Notice: Subject to any disclaimer, the term of this patent is extended or adjusted under 35 U.S.C. 154(b) by 7 days.

(21) Appl. No.: 16/307,329

(22) PCT Filed: Dec. 5, 2016

(86) PCT No.: PCT/CN2016/108506
§ 371 (c)(1),
(2) Date: Dec. 5, 2018

(87) PCT Pub. No.: WO2018/000724
PCT Pub. Date: Jan. 4, 2018

(65) Prior Publication Data
US 2019/0139186 A1    May 9, 2019

(30) Foreign Application Priority Data

Jun. 28, 2016  (CN) .......................... 2016 1 0488505

(51) Int. Cl.
*G06T 1/20*      (2006.01)
*G06F 9/50*     (2006.01)
(Continued)

(52) U.S. Cl.
CPC .............. *G06T 1/20* (2013.01); *G06F 9/3877* (2013.01); *G06F 9/3885* (2013.01); *G06F 9/50* (2013.01);
(Continued)

(58) Field of Classification Search
None
See application file for complete search history.

(56) References Cited

U.S. PATENT DOCUMENTS

2014/0016863 A1*  1/2014  Saxena ................ G06K 9/4652
                                                                    382/165
2014/0185941 A1*  7/2014  Li ........................ G06K 9/4671
                                                                    382/201
(Continued)

FOREIGN PATENT DOCUMENTS

| CN | 104732221 A | 6/2015 |
| CN | 105550974 A | 5/2016 |
| CN | 106095588 A | 11/2016 |

OTHER PUBLICATIONS

Zhang et al. "Accelerating CDVS Extraction on Mobile Platform", 2015 IEEE International Conference on Image Processing (ICIP) (Year: 2015).*

(Continued)

*Primary Examiner* — Tapas Mazumder
(74) *Attorney, Agent, or Firm* — Miles & Stockbridge P.C.

(57) ABSTRACT

Embodiments of the present disclosure provide a method for accelerating CDVS extraction process based on a GPGPU platform, wherein for the stages of feature detection and local descriptor computation of the CDVS extraction process, operation logics and parallelism strategies of respective inter-pixel parallelism sub-procedures and respective inter-feature point parallelism sub-procedures are implemented by leveraging an OpenCL general-purpose parallel-
(Continued)

ism programming framework, and acceleration is achieved by leveraging a GPU's parallelism computation capability; including: partitioning computing tasks for a GPU and a CPU; reconstructing an image scale pyramid storage model; assigning parallelism strategies to respective sub-procedures for the GPU; and applying local memory to mitigate the access bottleneck. The technical solution of the present disclosure may accelerate the CDVS extraction process and significantly enhances the extraction performance.

9 Claims, 6 Drawing Sheets (51) Int. Cl.
  *G06K 9/46* (2006.01)
  *G06F 9/38* (2018.01)
  *G06F 17/10* (2006.01)
(52) U.S. Cl.
  CPC .......... *G06F 9/5027* (2013.01); *G06F 9/5066* (2013.01); *G06K 9/4628* (2013.01); *G06F 17/10* (2013.01)

(56) References Cited

U.S. PATENT DOCUMENTS

| | | | |
|---|---|---|---|
| 2015/0154456 A1* | 6/2015 | Pau | G06K 9/4671 382/201 |
| 2016/0307068 A1* | 10/2016 | Pau | G06F 16/583 |

OTHER PUBLICATIONS

Massimo Balestri et al., "Accurate and Efficient Visual Search on Embedded Systems", Proc. of the Third Intl. Conf. Advances in Computing, Communication and Information Technology, Dec. 2015, pp. 61-66.

Lingyu Duan et al., "Overview of the MPEG-CDVS Standard", IEEE Transactions on Image Processing, vol. 25, No. 1, Jan. 2016, pp. 179-194.

Ling-Yu Duan et al., "Compact Descriptors for Mobile Visual Search and MPEG CDVS Standardization", Circuits and Systems (ISCAS), May 23, 2013, pp. 885-888.

David G. Lowe, "Distinctive Image Features from Scale-Invariant Keypoints", International Journal of Computer Vision 60(2), 2004, pp. 91-110.

Jie Chen et al., "A Low Complexity Interest Point Detector", IEEE Signal Processing Letters, vol. 22, No. 2, Feb. 2015, pp. 172-176.

A. Garbo et el., "CDVS Feature Selection on Embedded Systems", International Conference on Multimedia & Expo Workshops, IEEE, 2015, 6 pages.

Shen Zhang et al., Accelerating CDVS Extraction on Mobile Platform, International Conference on Image Processing, IEEE, ICIP 2015, pp. 3837-3840.

David Luebke et al., "GPGPU: General Purpose Computation on Graphics Hardware", ACM SIGGRAPH 2004 Course Notes, ACM, 2004, pp. 87-91.

\* cited by examiner

METHOD FOR ACCELERATING A CDVS EXTRACTION PROCESS BASED ON A GPGPU PLATFORM

CROSS-REFERENCE TO RELATED APPLICATIONS

The present application is a national stage filing under 35 U.S.C. § 371 of PCT/CN2016/108506, filed on Dec. 5, 2016 which claims priority to CN Application No. 201610488505.6 filed on Jun. 28, 2016. The applications are incorporated herein by reference in their entirety.

FIELD

Embodiments of the present disclosure generally relate to the field of image processing, specifically relate to a visual search method, and more particularly relate to a method for accelerating a CDVS (Compact Descriptors for Visual Search) extraction process based on a GPGPU platform.

BACKGROUND

Visual search technologies have gained an expeditious development in the recent twenty years; particularly with popularity of the Internet, various kinds of applications built around visual search have changed people's ways of life to a great extent, e.g., search engine-based image retrieval, object identification in a monitoring application, and etc. Generally, a primary goal for visual search is to search a representative set of feature points in an image and then perform relevant matching work based on the set of feature points.

MPEG-7 CDVS (Compact Descriptors for Visual Search) disclosed in Literature [1] (Duan L Y, Chandrasekhar V, Chen J, et al. Overview of the MPEG-CDVS Standard[J]. IEEE Transactions on Image Processing, 2015, 25(1):323-332) is a visual search standard proposed by the ISO/IEC MPEG in July 2014. The standard is to define the formats of CDVS, descriptor extraction process, and visual search framework so as to enable an interoperability between visual search applications which comply with the standard.

SIFT (Scale Invariant Feature Transform), a typical algorithm disclosed in Literature [2] (Lowe D G. Distinctive Image Features from Scale-Invariant Keypoints Pt International Journal of Computer Vision, 2004, 60(2):91-110), needs to use all feature points of an image for image matching. This approach would give rise to two extra overheads in practical applications, i.e., time delay in matching against a considerable number of target pictures and time delay in transmission over a low-bandwidth network. The two kinds of time delays account for most of the time consumed by the overall image matching process. CDVS is an improvement for the two drawbacks. According to Duan, during an image matching process, only a subset from all feature points is used, and the compact descriptor was constructed by the subset, so as to promote matching efficiency and meanwhile reduce transmission load.

Although the MPEG-7 CDVS may reduce the data amount for network transmission and promote the performance of pairwise image matching, an algorithm process utilized by the standard during the extraction process has a high computational complexity, which behaves rather time-consuming in practical applications. For example, on the Intel® Core™ i7-2600K 3.4 GHz processor, only about 4 frames of standard VGA size (640×480p) images can be processed per second. The process is even slower on a mobile device, e.g., on a Samsung Galaxy S3 mobile phone, only about 1 frame of image of the same size can be processed per second. Such a slow extraction speed limits, to a large extent, the influence of the standard; therefore, accelerating the CDVS extraction process becomes particularly urgent and important for applying and promoting the standard.

Currently, some works are directed to algorithms of accelerating the CDVS extraction process, while some are directed to technical applications thereof; but generally, such works are rare. A BFLoG (Block based Frequency Domain Laplacian of Gaussian) fast detection method was proposed in Literature [3] (Chen J, Duan L Y, Gao F, et al. A Low Complexity Interest Point Detector[J]. IEEE Signal Processing Letters, 2015, 22(22):172-176.), i.e., transforming Gaussian convolution from a temporal domain to a frequency domain. This method achieved a 2.0× speed-up over the whole feature detection stage of the extraction process. Literature [4] (Garbo A, Loiacono C, Quer S, et al. CDVS Feature Selection on Embedded Systems[C]. IEEE International Conference on Multimedia & Expo Workshops. IEEE, 2015:1-6) proposed an algorithm improvement method, i.e., only computing the local descriptors of selected feature points for the sake of saving the time of the local descriptor computation stage. Gaobo et al. also attempted to achieve a further speedup on a mobile device using OpenCL and GPU; however, the method presented does not comply with the OpenCL standard. Generally, the speed-up method of Garbo et al. may achieve an approximately 2.0× speed-up over the whole CDVS extraction process. Literature [5] (Zhang Shen, Wang Ronggang, Wang Qiusi, Wang Wenmin. Accelerating CDVS Extraction on Mobile Platform[C]. IEEE International Conference on Image Processing (ICIP). IEEE, 2015: 3837-3840) proposed a method for accelerating a CDVS extraction process based on an ARM platform, i.e., achieving speed-up by applying NEON SIMD multimedia instructions and a multi-core parallelism mechanism of the ARM processor, which could achieve an approximately 2.3× speed-up over the overall CDVS extracting process.

The GPGPU (General-Purpose Computing on Graphics Processing Units) technology, as disclosed in the Literature [6] (Luebke D, Harris M, Ger J, et al. GPGPU: General Purpose Computation on Graphics Hardware[C]. ACM SIGGRAPH 2004 Course Notes. ACM, 2004:87-91.), is a novel technology evolved in the recent decade. Although GPU (Graphic Processing Unit) had already been widely known and extensively applied in professional fields such as image rendering (e.g., 3D image rendering framework OpenGL) theretofore, neither the GPU nor the programming framework were "general-purpose." Previous GPUs were always devised with fixed pipelines, such that fixed programming interfaces completely restricted higher-layer applications; a consequence was that a non-general-purpose image rendering pipeline could not carry on the task with a relatively complex algorithm logic such as image processing. The advent of GPGPU relieves the restrictions of fixed pipelines, which provides an opportunity for the emergence of a more flexible higher-layer programming framework. Besides, with improvement of the GPU fabricating process, the single-core operating frequency or caching capacity, in addition to the number of integrated operating cores, is significantly improved. Therefore, the current GPGPU has a better parallelism computation capability over a CPU (Central Processing Unit).

In view of the above, it is much practical to accelerate an MPEG-7 CDVS extraction process. However, the acceleration performance achieved by currently existing accelerating methods cannot suffice for the performance requirements of visual search applications based on this standard. The GPGPU's strong parallelism computation capability provides a new possibility of achieving a better acceleration effect.

SUMMARY

To reduce the time overhead of an MPEG-7 CDVS initial extraction process, the present disclosure provides a method for accelerating a CDVS extraction process based on a GPGPU platform, which accelerates the MPEG-7 CDVS extraction process using GPGPU, i.e., reducing the time overheads of the CDVS extraction process based on the parallelism computation capability of the GPGPU with OpenCL as a programming implementation framework by repartitioning computing tasks, selecting a parallelism strategy, and applying other auxiliary optimization technologies.

The present disclosure comprises three parts: algorithm framework reconstruction for a CDVS extraction process, parallelism strategies with OpenCL as a programming implementation framework, and other auxiliary optimization technologies. First, the present disclosure repartitions computing tasks of respective stages of the CDVS extraction process based on the GPGPU platform, i.e., assigning the computing tasks of a feature detection stage and a local descriptor computation stage, which are two bottleneck stages, to the GPU, while reserving the computing tasks of the rest stages to the CPU. Then, when devising OpenCL parallelism strategies, the present disclosure adopts a two-dimensional work-group partition approach for respective inter-pixel parallelizable sub-procedures while adopts a one-dimensional work-group partition approach for respective inter-feature point parallelizable sub-procedures, where 32 is the optimal individual dimension partition of a work-group size. Finally, the present disclosure adopts two auxiliary optimization technologies to further improve the acceleration performance of the CDVS extraction process on the GPGPU platform, including: transforming an inter-octave discontinuous image scale-space pyramid storage model to an inter-octave continuous image scale-space pyramid storage model so as to pull out a primary orientation assignment sub-procedure and a descriptor computation sub-procedure from the operation logic of each octave of the image scale-space pyramid, i.e., first completely computing feature detection and gradient computation at all octaves, and then uniformly performing primary orientation assignment and descriptor computation to all feature points; and applying local memory at the descriptor computation sub-procedure to mitigate the access bottleneck on the GPU at this sub-procedure.

A technical solution of the present disclosure is provided below:

A method for accelerating a CDVS extraction process based on a GPGPU platform, successively comprising steps of:

Step 1: partitioning CPU computing tasks and GPU computing tasks, wherein a feature detection stage and a local descriptor computation stage in the CDVS extraction process are assigned to a GPU, while a feature selection stage, a global descriptor aggregation stage, a local descriptor compression stage, and a coordinate coding stage left in the CDVS extraction process are assigned to the CPU; sub-procedures of the feature detection stage includes a Gaussian convolution sub-procedure, a Laplacian convolution sub-procedure, a polynomial coefficient computation sub-procedure, a response value computation sub-procedure, and a detection sub-procedure; sub-procedures of the local descriptor computation stage include: a gradient computation sub-procedure, a primary orientation assignment sub-procedure, and a descriptor computation sub-procedure; and obtaining source kernel programs for operation logics of the sub-procedures assigned to the GPU to further obtain GPU executable program objects;

Step 2: reconstructing an image scale-space pyramid storage model to transform an inter-octave discontinuous storage model into an inter-octave continuous storage model, so as to first complete inter pixel parallelizable procedures or sub-procedures at all octaves of the pyramid and then uniformly compute inter-feature point parallelizable sub-procedures, wherein the inter-pixel parallelizable procedures or sub-procedures include the feature detection stage and the gradient computation sub-procedure of the local descriptor computation stage; and the inter-feature point parallelizable sub-procedures include the primary orientation assignment sub-procedure and the descriptor computation sub-procedure of the local descriptor computation stage;

Step 3: specifying parallelism strategies for the respective sub-procedures assigned to the GPU using a two-dimensional work-group partition and a one-dimensional work-group partition, respectively, wherein the respective sub-procedures assigned to the GPU include the the Gaussian convolution sub-procedure, the Laplacian convolution sub-procedure, the polynomial coefficient computation sub-procedure, the response value computation sub-procedure, and the detection sub-procedure of the feature detection stage and the gradient computation sub-procedure, the primary orientation assignment sub-procedure, and the descriptor computation sub-procedure of the local descriptor computation stage;

Step 4: applying local memory, wherein during the descriptor computation sub-procedure of the local descriptor computation stage, the feature points in the one-dimensional work-group of the present sub-procedure are assigned a storage space in the local memory, such that during the descriptor computation sub-procedure, all updates occur in the assigned storage space in the local memory; and updating a global memory using the descriptor data in the local memory after completing the descriptor computation sub-procedure;

thereby realizing acceleration of the CDVS extraction process.

In the method for accelerating a CDVS extraction process based on a GPGPU platform, the first step of partitioning CPU computing tasks and GPU computing tasks are further implemented through the following operations:

11) implementing, by leveraging an OpenCL kernel program, operation logics of the Gaussian convolution sub-procedure, the Laplacian convolution sub-procedure, the polynomial coefficient computation sub-procedure, the response value computation sub-procedure, the detection sub-procedure, the gradient computation sub-procedure, the primary orientation assignment sub-procedure, and the descriptor computation sub-procedure, to obtain eight source kernel programs;

12) successively invoking OpenCL interfaces clCreateProgramWithSource, clBuildProgram, and clCreateKernel to soft compile the eight source kernel programs in the step 11) to obtain GPU executable program objects;

13) implementing, by leveraging the C language, operation logics of the feature selection stage, the local descriptor compression stage, the coordinate coding stage, and the global descriptor aggregation stage.

In the first step of partitioning GPU and CPU computing tasks, all computing tasks of the feature detection stage and the local descriptor computation stage are assigned to the GPU, while the computing tasks of the rest stages are assigned to the CPU; moreover, the computing tasks of the primary orientation assignment sub-procedure and the descriptor computation sub-procedure are pulled out of each octave of the pyramid, i.e., first completing the computing tasks of the sub-procedures with the pixels as independent operands on all octaves of the pyramid, then uniformly performing, for the feature points on all octaves, the primary orientation assignment sub-procedure and the descriptor computation sub-procedure which take feature points as independent operands.

In the method for accelerating a CDVS extraction process based on the GPGPU platform, the second step of reconstructing the image scale-space pyramid storage model specifically performs the following operations:

21) invoking the OpenCL interface clCreateBuffer to uniformly apply for a storage space on the GPU for all octaves of the image scale-space pyramid. Assuming that the length and width of the input image be W and H, respectively, and the pyramid include N (N=1, 2, 3 . . . ) octaves, then a storage space size S is computed through equation 1:

$$S = \left(1 + \frac{1}{4} + \frac{1}{4^2} + \ldots + \frac{1}{4^{N-1}}\right) \times W \times H \times sizeof(\text{cl\_float}) \quad \text{(Equation 1)}$$

where S denotes a storage space size in bytes. Because the size of the first octave of the pyramid equals to the size of the input image, all higher octaves are obtained by downsampling respective immediate lower octaves though halving the length and width thereof.

22) constructing the image scale-space pyramid octave by octave, where an initial address offset offset of each octave is computed through equation 2:

$$\begin{cases} \text{offset} = (4 + 4^2 + \ldots + 4^n) \times w \times h, n \geq 1 \\ \text{offset} = 0, n = 0 \end{cases} \quad \text{(equation 2)}$$

where w denotes the length of a certain octave of the pyramid; h denotes a width thereof; and n denotes the serial number thereof, n=0, 1, 2, . . . ;

23) executing other logics of constructing the scale-space pyramid, which are analogous to the method disclosed in literature [1] (Duan L Y, Chandrasekhar V, Chen J, et al. Overview of the MPEG-CDVS Standard[J]. IEEE Transactions on Image Processing, 2015, 25(1):323-332).

In the method for accelerating a CDVS extraction process based on the GPGPU platform, the third step of specifying parallelism strategies for the respective sub-procedures assigned to the GPU using the two-dimensional work-group partition and the one-dimensional work-group partition, respectively, specifically comprises steps of:

31) specifying a global work-group size for all inter-pixel parallelizable sub-procedures;

32) specifying a local work-group size for all inter-pixel parallelizable sub-procedures;

33) specifying a global work-group size for all inter-feature point parallelizable sub-procedures;

34) specifying a local work-group size for all inter-feature point parallelizable sub-procedures.

When specifying the parallelism strategies for respective sub-procedures on the GPU in the third step, a two-dimensional work-group is specified for respective sub-procedure with pixels as independent operands, wherein one work-item in the work-group is responsible for an operation logic of one pixel, the work-group size being set to 32×32; besides, a one-dimensional work-group is specified to respective sub-procedure with feature points as independent operands, wherein one work-item in the work-group is responsible for the operation logic of one feature point, the work-group size being set to 32;

furthermore, the global work-group size in step 31) is specifically: assuming that the length and width of the octave of the pyramid are w and h, respectively, then an array globalWorkSize[2] that including two integers is set, causing globalWorkSize[0]=w, globalWorkSize[1]=h;

the local work-group size in step 32) is specifically: an array localWorkSize[2] including two integers is directly set, causing that when the size of an octave of the pyramid is 640×480p, then localWorkSize[0]=32 and localWorkSize[1]=32; when the size of an octave of the pyramid is 320×240p, then localWorkSize[0]=32 and localWorkSize[1]=16; when the size of an octave of the pyramid is 160×120p, then localWorkSize[0]=32 and localWorkSize[1]=8; when the size of an octave of the pyramid is 80×60p, when localWorkSize[0]=16 and localWorkSize[1]=4; when the size of an octave of the pyramid is 40×30p, then localWorkSize[0]=8 and localWorkSize[1]=2;

the global work-group size in step 33) is specifically: assuming that the total amount of the feature points detected at the feature detection stage is n(n=1, 2, 3, . . . ), an array globalWorkSize[1] including one integer is set, causing globalWorkSize[0]=n;

the local work-group size in step 34) is specifically: directly setting an array localWorkSize[1] including one integer, causing localWorkSize[0]=32.

In the method for accelerating a CDVS extraction process based on the GPGPU platform, further, a parallelism execution strategy of the GPU is determined by specifying the set globalWorkSize and localWorkSize as parameters of OpenCL interface clEnqueueNDRangeKernel, and in the local work-group partition strategy, 32 is the optimal individual dimension partition of a work-group size.

In the method for accelerating a CDVS extraction process based on the GPGPU platform, the fourth step of applying local memory is specifically implemented through the following steps:

41) assigning local memory to the feature points in the one-dimensional work-groups;

42) during executing the kernel program, accessing to and updating of the descriptors whose feature points include 128 floating points occur over the local memory assigned at step 41);

43) updating the descriptors in the global memory using the descriptors in the assigned local memory after completing the operation logics of the sub-procedures assigned to the GPU.

In the method for accelerating a CDVS extraction process based on the GPGPU platform, further, the input image in the extracting process is a 640×480p JPEG image.

Compared with the prior art, the present disclosure has the following beneficial effects:

The present disclosure provides a technology of accelerating an MPEG-7 CDVS extraction process using GPGPU in the technical field of image processing, which may effectively reduce the time consumption of the CDVS extraction process. The present disclosure has the following advantages:

(1) the present disclosure may effectively utilize the parallelism computation capability of the GPU to reduce time overheads of the bottleneck stages of the CDVS extraction process, thereby achieving a better acceleration to satisfy the performance requirement of visual search applications;

(2) the way of reconstructing the image scale-space pyramid storage model according to the present disclosure results in a better parallelism during the inter-feature point parallelism sub-procedures;

(3) when implementing parallelism strategies using OpenCL according to the present disclosure, the work-group partition manners as adopted are optimal partition manners on the NVIDIA GTX-980 GPU obtained through experiments;

(4) the present disclosure applies local memory to the descriptor computation sub-procedure of the CDVS extraction process on the GPGPU platform, which mitigates the memory access bottleneck at this sub-procedure, thereby improving the performance of this sub-procedure.

BRIEF DESCRIPTION OF THE DRAWINGS

where (a) shows partitioning main stages of the CDVS extraction process, including six stages, which are feature detection, feature selection, local descriptor computation, global descriptor aggregation, local descriptor compression, and coordinate coding; (b) shows partitioning sub-procedures of the feature detection stage, including five sub-procedures, which are Gaussian convolution, Laplacian convolution, polynomial coefficient computation (ABCD), response value computation, and detection; (c) shows sub-procedure partitions of the local descriptor computation stage, including three sub-procedures, which are gradient computation, primary orientation assignment, and descriptor computation.

where (a) is an inter-octave discontinuous pyramid storage model; (b) is an inter-octave continuous pyramid storage model.

where (a) shows a scheme of partitioning a two-dimensional work-group; (b) shows a scheme of partitioning work-items in the two-dimensional work-group; (c) shows a scheme of partitioning a one-dimensional work-group and a scheme of partitioning work-items in the one-dimensional work-group, wherein the two-dimensional work-group have two dimensions, x and y.

where (a) shows performances of the Gaussian convolution sub-procedure when adopting different sizes of work-group partitions; (b) shows performances of the descriptor computation sub-procedure when adopting different sizes of work-group partitions.

where (a) denotes the acceleration performance of the primary orientation assignment sub-procedure; (b) denotes the acceleration performance of the descriptor computation sub-procedure; the size of the input image is 640×480p; the numerical values in the transverse-axis tags F 567, F_988, F 1336 and F 1628 represent four different numbers of feature points, e.g., F_567 represents 567 feature points that may be detected from the image by the CDVS extraction process under an initial condition.

where LFD, an abbreviation of Local Feature Detection, here represents a sum of time consumptions of all of the five sub-procedures of the feature detection stage; LDC, an abbreviation of Local Descriptor Computation, here represents a sum of time consumptions of all of the three sub-procedures of the local descriptor computation stage; GDA, an abbreviation of Global Descriptor Aggregation, here represents a sum of time consumptions of other procedures without being accelerated (including feature selection, global descriptor aggregation, local descriptor compression, and coordinate coding); the size of the input image is 640×480p; before acceleration, the overall time consumption of the extraction process increases with the number of feature points.

DETAILED DESCRIPTION OF EMBODIMENTS

Hereinafter, the present disclosure is further described through the embodiments, but the scope of the present disclosure is not limited in any manner.

The present disclosure provides a method for accelerating an MPEG-7 CDVS extraction process based on GPGPU, which may effectively reduce time consumption of the CDVS extraction process.

In the field of image processing, because the GPU does not support direct programming, the present disclosure leverages an external programming framework to implement an accelerating strategy, wherein an open computing language OpenCL (The Khronos OpenCL Work-Group. OpenCL Specification v1.2[S]. 2012) is selected as an implementation medium, mainly out of a consideration that the cross-platform capability of this framework may conveniently migrate the work on one platform to another OpenCL-enabled platform.

Figure 1:
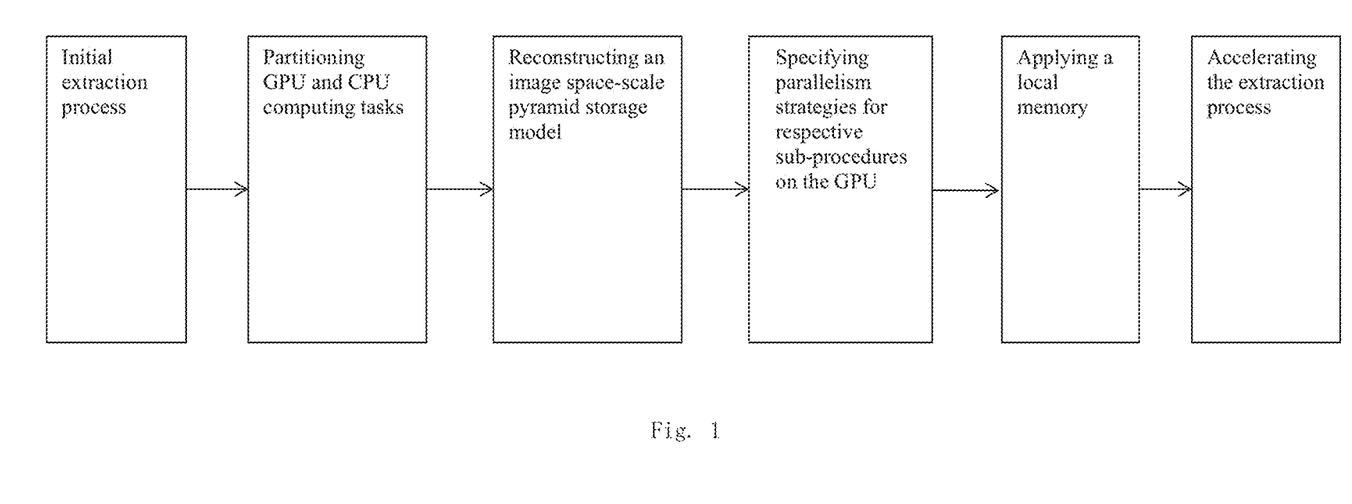
FIG. 1 is an overall flow diagram of a method according to the present disclosure, wherein the accelerating method provided by the present disclosure is a method of applying a GPGPU platform-based optimization technology to the bottleneck procedures of the CDVS extraction process, which is based on the CDVS initial extraction process and thereby further accelerate the extraction process.
Figure 2:
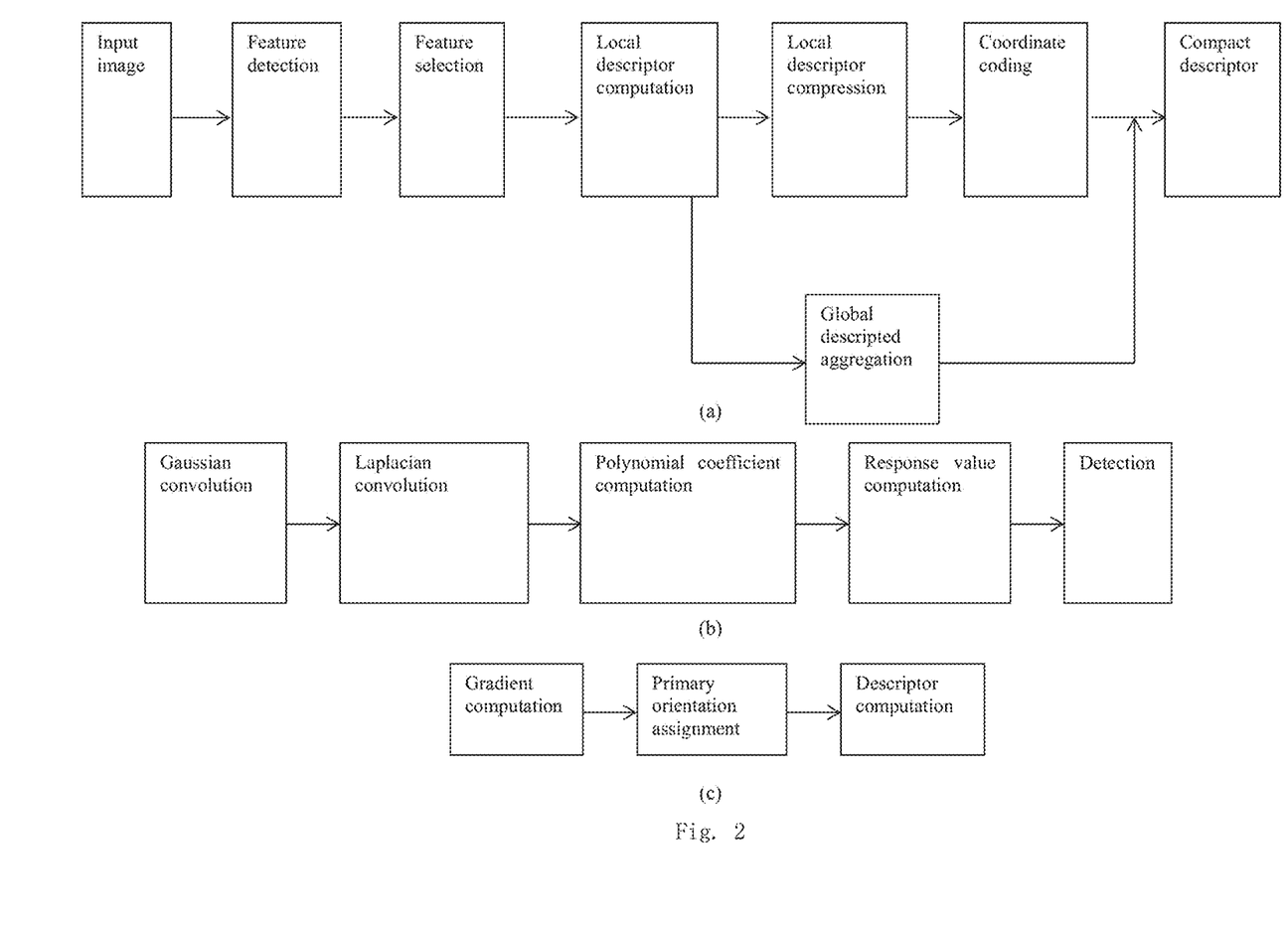
FIG. 2 is a flow partition block diagram of an existing method of CDVS extraction.

Main procedures of the CDVS extraction process include six stages, which are feature detection, feature selection, local descriptor computation, global descriptor aggregation, local descriptor compression, and coordinate coding; sub-procedures of the feature detection stage include five sub-procedures, which are Gaussian convolution, Laplacian convolution, polynomial coefficient computation (ABCD), response value computation, and detection; the local descriptor computation stage includes three sub-procedures, which are gradient computation, primary orientation assignment, and descriptor computation (see FIG. 2). Respective procedures or sub-procedures are executed according to a flow logic sequence shown in FIG. 2. The six sub-procedures, i.e. Gaussian convolution, Laplacian convolution, polynomial coefficient computation, response value computation, detection, and gradient computation, may be collectively referred to as inter-pixel parallelizable sub-procedures, because the inter-pixel operation logics in these sub-procedures are mutually independent; the primary orientation assignment sub-procedure and the descriptor computation sub-procedure are collectively referred to as inter-feature point parallelizable sub-procedures, because the inter-feature point operation logics in these sub-procedures are mutually independent.

The input in the CDVS extraction process is a 640×480p JPEG image, while the output is a compact descriptor [1] in the format defined by the MPEG-7 CDVS standard.

Implementation of the present disclosure specifically comprises steps of:

Step 1: partitioning CPU computing tasks and GPU computing tasks, wherein a feature detection stage and a local descriptor computation stage in the CDVS extraction process are assigned to a GPU, and the rest stages are assigned to a CPU. The feature detection stage and the local descriptor computation stage are bottleneck stages in the CDVS extraction process (the time overheads taken up by the two stages on the CPU account for 90% above of the time overhead of the whole CDVS extraction process); a core idea of the present disclosure is to reduce the time overheads of the two bottleneck stages by leveraging the parallelism computation capability of the GPU. A basis for this assigning is that respective sub-procedures in the two bottleneck stages have a good parallelism, while the rest four stages lack a parallelism capability suitable for the GPU parallelism mechanism.

This step is specifically implemented by:

11) implementing, by leveraging an OpenCL kernel program, operation logics of eight sub-procedures, which are Gaussian convolution, Laplacian convolution, polynomial coefficient computation, response value computation, detection, gradient computation, primary orientation assignment, and descriptor computation, to obtain eight source kernel programs;

12) successively invoking OpenCL interfaces clCreateProgramWithSource, clBuildProgram, and clCreateKernel to soft-compile (i.e., compiling an object program when executing the subject program) the eight source kernel programs in the step 11) to obtain GPU executable program objects;

13) implementing, by leveraging the C language, operation logics of four main stages, which are feature selection, local descriptor compression, coordinate coding, and global descriptor aggregation.

Figure 3:
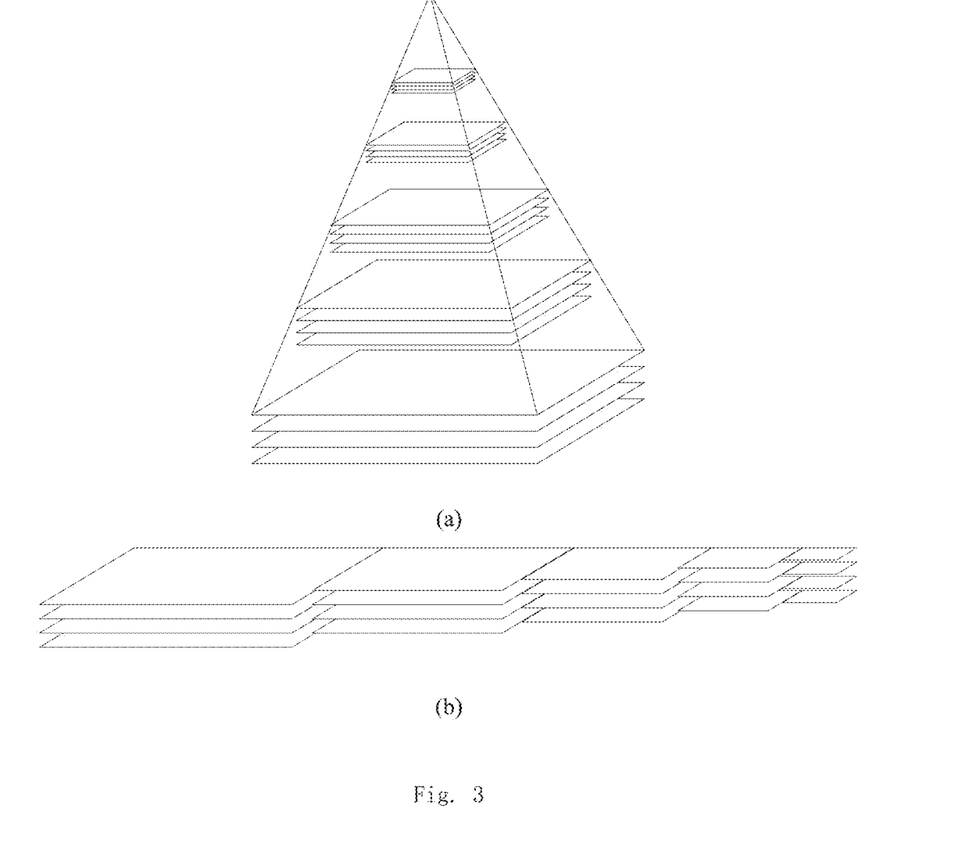
FIG. 3 shows a schematic diagram of reconstructing the inter-octave discontinuous scale-space pyramid storage model into an inter-octave continuous pyramid storage model according to the present disclosure.

Step 2: reconstructing an image scale-space pyramid storage model to transform an inter-octave discontinuous storage model into an inter-octave continuous storage model (see FIG. 3). In this way, the inter-feature point parallelizable sub-procedures, which refer to the primary orientation assignment sub-procedure and the descriptor computation sub-procedure, may be pulled out of the operation logic of each octave of the image scale-space pyramid, i.e., first completing the inter-pixel parallelizable procedures or sub-procedures such as feature detection and gradient computation at all octaves of the pyramid, then uniformly performing inter-feature point parallelizable sub-procedure computations. In this way, the inter-feature point parallelism of the primary orientation assignment sub-procedure and the descriptor computation sub-procedure may be enhanced, therefore utilizing the GPU's parallelism computation mechanism more efficiently.

This step is specifically implemented by:

21) invoking the OpenCL interface clCreateBuffer to uniformly apply for a storage space on the GPU for all octaves of the image scale-space pyramid. Assuming that the length and width of the input image are W and H, respectively, and the pyramid includes N (N=1, 2, 3 . . . ) octaves, then a storage space size S is computed through equation 1:

$$S = \left(1 + \frac{1}{4} + \frac{1}{4^2} + \ldots + \frac{1}{4^{N-1}}\right) \times W \times H \times sizeof(\text{cl\_float}) \quad \text{(Equation 1)}$$

where S denotes a storage space size in bytes. Because the size of the first octave of the pyramid equals to the size of the input image, all higher octaves are obtained by down-sampling respective immediate lower octaves though halving the length and width thereof.

22) constructing the image scale-space pyramid octave by octave. A key of this step lies in that an initial address offset offset of each octave is determined based on the length w, the width h, and the serial number n (n=0, 1, 2, . . . ) of the octave and satisfies equation 2:

$$\begin{cases} \text{offset} = (4 + 4^2 + \ldots + 4^n) \times w \times h, n \geq 1 \\ \text{offset} = 0, n = 0 \end{cases} \quad \text{(equation 2)}$$

Executing other logics for constructing the scale-space pyramid are analogous to the existing methods [1].

Figure 4:
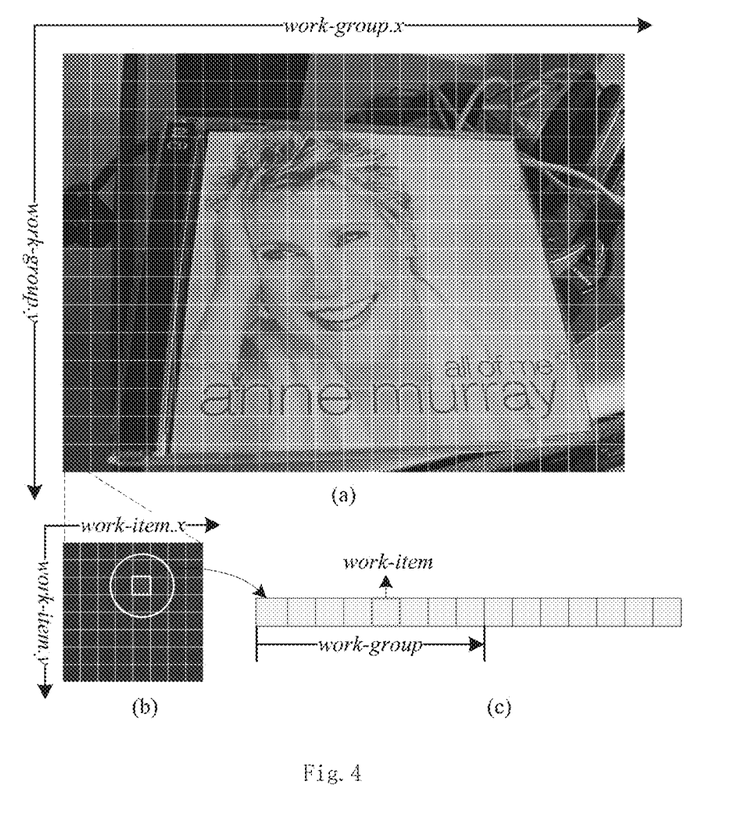
FIG. 4 is a schematic diagram of a work-group partition strategy and a work-item partition strategy implemented using OpenCL according to the present disclosure.

Step 3: specifying parallelism strategies to the respective sub-procedures of feature detection stage (including 5 sub-procedures) and the respective sub-procedures of local description computing stage (including three sub-phases) assigned to the GPU using a two-dimensional work-group partition and a one-dimensional work-group partition, respectively (see FIG. 4).

This step is specifically implemented by:

31) specifying a global work-group size for all inter-pixel parallelizable sub-procedures. Assuming that the length and width of the octave of the pyramid are w and h, respectively, an array globalWorkSize[2] including two integers may be set, causing globalWorkSize[0]=w, globalWorkSize[1]=h;

32) specifying a local work-group size for all inter-pixel parallelizable sub-procedures. An array localWorkSize[2] including two integers is directly set, causing that when the size of an octave of the pyramid is 640×480p, then localWorkSize[0]=32 and localWorkSize[1]=32; when the size of an octave of the pyramid is 320×240p, then localWorkSize[0]=32 and localWorkSize[1]=16; when the size of an octave of the pyramid is 160×120p, then localWorkSize[0]=32 and localWorkSize[1]=8; when the size of an octave of the pyramid is 80×60p, when localWorkSize[0]=16 and localWorkSize[1]=4; when the size of an octave of the pyramid is 40×30p, then localWorkSize[0]=8 and localWorkSize[1]=2;

33) specifying a global work-group size for all inter-feature point parallelizable sub-procedures. Assuming that the total amount of the feature points detected during the feature detection stage is n (n=1, 2, 3, . . . ), an array globalWorkSize[1] including one integer is directly set, causing globalWorkSize[0]=n;

34) specifying a local work-group size for all inter-feature point parallelizable sub-procedures. An array localWorkSize[1] including one integer is directly set, causing localWorkSize[0]=32.

Figure 5:
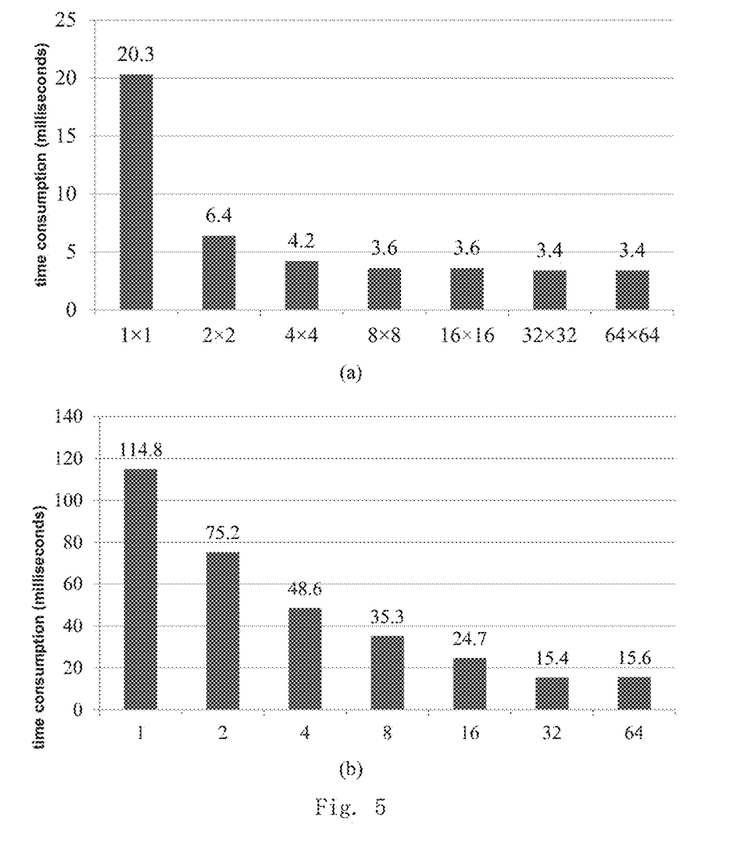
FIG. 5 shows performances of two most representative sub-procedures when adopting different sizes of work-group partitions in experiments according to the present disclosure.

A parallelism execution strategy of the GPU is finally determined by specifying the set globalWorkSize and localWorkSize as parameters of OpenCL interface clEnqueueNDRangeKernel, and in the local work-group partition strategy, 32 is set as an optimal size partition of the one-dimensional work-group. In the local work-group partition strategy, 32 is the optimal partition of an individual dimension size of the work-group. The reason is that the performance of respective sub-procedures will be restricted when the work-group has a relatively small size, while a larger work-group does not help to enhance the performance (see FIG. 5). Although other integers may also be adopted to partition the individual dimension, e.g., 16, 8, 4, and 2, it is only an expedience when the size of the global work-group cannot be exactly divided by 32.

Step 4: applying local memory, wherein during the descriptor computation sub-procedure, a storage space in the local memory is assigned to the feature points in the work-group of the present sub-procedure (each work-item in the work-group is responsible for an operation logic of one feature point, and the work-group is one dimensional). During the descriptor computing sub-procedure, because each feature point needs to frequently update its local descriptor including 128 floating points, i.e., the 128 components of all of the feature points of the local descriptor are accessed randomly at the same time, a relatively heavy access burden is incurred. In this case, firstly, storage space in the local memory are assigned respectively to all feature points in the work-group, and during the descriptor computation sub-procedure, the accessing to and updating of the descriptors all occur in the storage spaces of the local memory; after completing the descriptor computing sub-procedure, the global memory is updated using the descriptor data in the local memory. In this way, the access bottleneck of the descriptor computation sub-procedure may be mitigated.

This step is specifically implemented by:

41) assigning local memory to the feature points in the one-dimensional work-group;

42) during executing the kernel program, accessing to and updating of the descriptors whose feature points include 128 floating points occur on the local memory assigned at step 41);

43) updating the descriptors in the global memory using the descriptors in the assigned local memory after completing the operation logic of the descriptor computation sub-procedure.

To test the effectiveness of the present disclosure, the present disclosure uses the graphic set Graphics provided by the CDVS standardization organization and compares the time overhead of the CDVS initial extraction process against that the accelerated extraction process. The input image is a JPEG image with a fixed size of 640×480p, because the CDVS standard specifies downsampling all images with a length or width greater than 640 pixels to cause the length or width to be 640 pixels, which one is lager.

Figure 6:
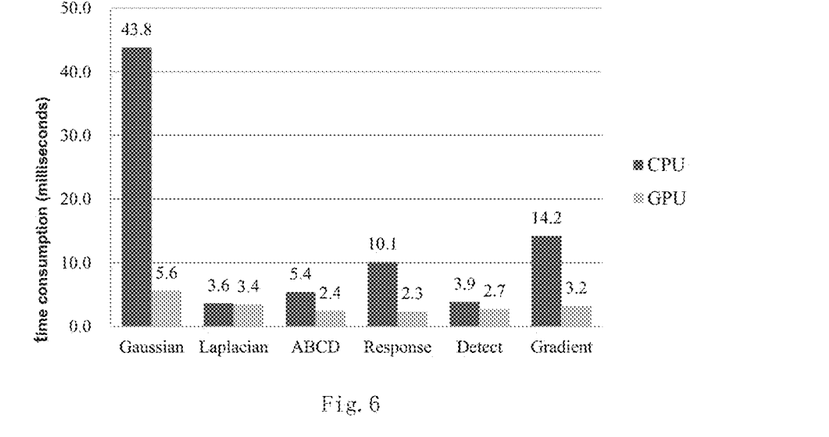
FIG. 6 shows acceleration performances of respective inter-pixel parallelizable sub-procedures in the experiments according to the present disclosure, where the size of input image is 640×480p.

FIG. 6 shows comparison between time consumptions of respective inter-pixel parallelizable sub-procedures before and after acceleration. These sub-procedures include all of the five sub-procedures of the feature detection stage, i.e., Gaussian convolution (Gaussian), Laplacian convolution (Laplacian), descriptor coefficient computation (ABCD), response value computation (Response), and detection (Detect), as well as the Gradient computation (Gradient) sub-procedure of the local descriptor procedure. It is seen from the figure that the Gaussian convolution sub-procedure has the highest speed-up ratio, reaching 7.9×, the Laplacian convolution has the lowest speed-up ratio, only 1.0×, and the mean weighted speed-up of all sub-procedures is 4×.

Figure 7:
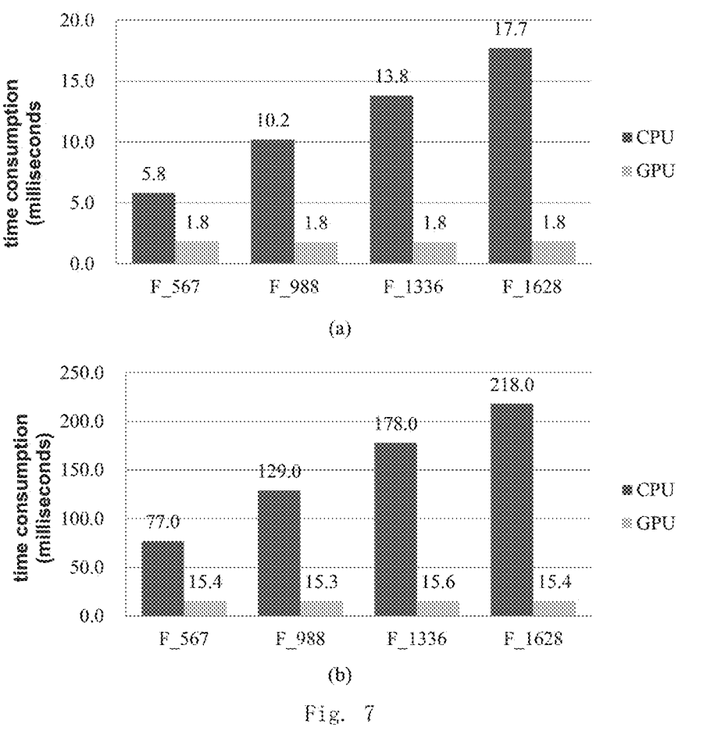
FIG. 7 shows acceleration performances of respective inter-feature point parallelizable sub-procedures in the experiments according to the present disclosure.

FIG. 7 shows comparison between time consumptions of respective inter-feature point parallelizable sub-procedures before and after acceleration. These sub-procedures refer to two sub-procedures of the local descriptor computation stage, i.e., primary orientation assignment and descriptor computation. It is seen that the speed-up ratio of the primary orientation sub-procedure is 3.2~9.6×, approximately 6.4× in average; the speed-up ratio of the descriptor computation sub-procedure is 5.0~14.2×, approximately 9.6× in average. The initial time consumptions of the two sub-procedures increase with the number of feature points; however, after acceleration, the time consumptions are very stable.

Figure 8:
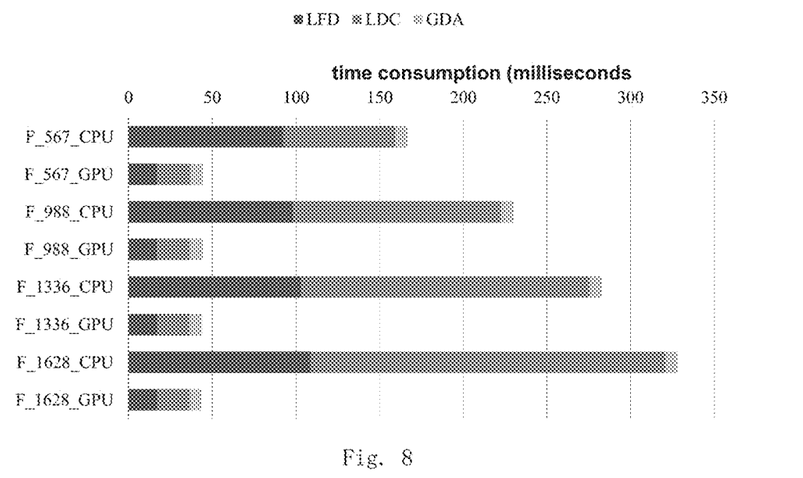
FIG. 8 shows a performance comparison diagram between time consumptions of accelerating the wholeCDVS extraction process in the experiments before and after adopting the method provided by the present disclosure.

FIG. 8 shows the time consumptions of the whole CDVS extraction process before and after acceleration. It may be seen from the figure that the initial time consumption of the whole extraction process increases with the number of feature points, distributed in a range from 170~330 milliseconds, while after the acceleration, the overall time consumption is stabilized at approximately 45 milliseconds, and the overall speed-up ratio is 3.8~7.2×, approximately 5.5× in average.

In view of the above, the GPGPU platform-based accelerating technology may significantly reduce the time overhead of the CDVS extraction process and then realize acceleration.

It needs to be noted that the embodiments as disclosed are intended to facilitating further understanding of the present disclosure; however, those skilled in the art may understand that various substitutions and modifications are possible without departing from the spirit and scope of the present disclosure. Therefore, the present disclosure should not be limited to the contents disclosed in the embodiments, but should be governed by the appended claims.

We claim:

1. A method for accelerating a Compact Descriptors for Visual Search (CDVS) extraction process based on a General-Purpose Computing on Graphics Processing Units (GPGPU) platform, comprising successive steps of:

Step 1: partitioning Central Processing Unit (CPU) computing tasks and Graphics Processing Units (GPU) computing tasks by assigning a feature detection stage and a local descriptor computation stage in a CDVS extraction process to a GPU and assigning a feature selection stage, a global descriptor aggregation stage, a local descriptor compression stage, and a coordinate coding stage left in the CDVS extraction process to a CPU; wherein the feature detection stage includes sub-procedures including a Gaussian convolution sub-procedure, a Laplacian convolution sub-procedure, a polynomial coefficient computation sub-procedure, a response value computation sub-procedure, and a detection sub-procedure; wherein the local descriptor computation stage include sub-procedures including a gradient computation sub-procedure, a primary orientation assignment sub-procedure, and a descriptor computation sub-procedure; and obtaining source kernel programs for operation logics of the sub-procedures assigned to the GPU to further obtain GPU executable program objects;

Step 2: reconstructing an image scale-space pyramid storage model to transform an inter-octave discontinuous storage model into an inter-octave continuous storage model, so as to first complete inter-pixel parallelizable procedures or sub-procedures at all octaves of a pyramid and then uniformly compute inter-feature point parallelizable sub-procedures; wherein the inter-pixel parallelizable procedures or sub-procedures include the feature detection stage and the gradient computation sub-procedure of the local descriptor computation stage; and wherein the inter-feature point parallelizable sub-procedures include the primary orientation assignment sub-procedure and the descriptor computation sub-procedure of the local descriptor computation stage;

Step 3: specifying parallelism strategies for the respective sub-procedures assigned to the GPU using a two-dimensional work-group partition and a one-dimensional work-group partition, respectively; wherein the respective sub-procedures assigned to the GPU include the the Gaussian convolution sub-procedure, the Laplacian convolution sub-procedure, the polynomial coefficient computation sub-procedure, the response value computation sub-procedure, and the detection sub-procedure of the feature detection stage and the gradient computation sub-procedure, the primary orientation assignment sub-procedure, and the descriptor computation sub-procedure of the local descriptor computation stage;

Step 4: applying local memory, wherein during the descriptor computation sub-procedure of the local descriptor computation stage, feature points in a one-dimensional work-group of a present sub-procedure are assigned a storage space in the local memory, such that during the descriptor computation sub-procedure, all updates occur in the assigned storage space in the local memory; and updating a global memory using descriptor data in the local memory after completing the descriptor computation sub-procedure; and thereby realizing acceleration of the CDVS extraction process.

2. The method for accelerating a CDVS extraction process based on the GPGPU platform according to claim 1, wherein the first step of partitioning CPU computing tasks and GPU computing tasks are further implemented through the following operations:

11) implementing, by leveraging an OpenCL kernel program, operation logics of the Gaussian convolution sub-procedure, the Laplacian convolution sub-procedure, the polynomial coefficient computation sub-procedure, the response value computation sub-procedure, the detection sub-procedure, the gradient computation sub-procedure, the primary orientation assignment sub-procedure, and the descriptor computation sub-procedure, to obtain eight source kernel programs;

12) successively invoking OpenCL interfaces clCreateProgramWithSource, clBuildProgram, and clCreateKernel to soft compile the eight source kernel programs in step 11) to obtain GPU executable program objects; and 13) implementing, by leveraging C language, operation logics of the feature selection stage, the local descriptor compression stage, the coordinate coding stage, and the global descriptor aggregation stage.

3. The method for accelerating a CDVS extraction process based on the GPGPU platform according to claim 1, wherein the second step of reconstructing the image scale-space pyramid storage model, are further implemented through the following operations:

21) invoking OpenCL interface clCreateBuffer to uniformly apply for a storage space on the GPU for all octaves of the image scale-space pyramid; wherein, assuming that the length and width of an input image are W and H, respectively, and the pyramid include N (N=1, 2, 3 . . . ) octaves, a storage space size S is computed through Equation 1:

$$S = \left(1 + \frac{1}{4} + \frac{1}{4^2} + \ldots + \frac{1}{4^{N-1}}\right) \times W \times H \times sizeof(\text{cl\_float}) \quad \text{(Equation 1)}$$

where S denotes a storage space size in bytes; wherein the size of the first octave of the pyramid equals to the size of the input image, and all octaves higher than the first octave of the pyramid are obtained by downsampling respective immediate lower octaves though halving the length and width thereof;

22) constructing the image scale-space pyramid octave by octave, where an initial address offset (offset) of each octave is computed through Equation 2:

$$\begin{cases} \text{offset} = (4 + 4^2 + \ldots + 4^n) \times w \times h, n \geq 1 \\ \text{offset} = 0, n = 0 \end{cases} \quad \text{(Equation 2)}$$

where w denotes the length of a certain octave of the pyramid; h denotes a width thereof;

and n denotes the serial number thereof, n=0, 1, 2, . . . ; and 23) executing other logics of constructing the scale-space pyramid.

4. The method for accelerating a CDVS extraction process based on the GPGPU platform according to claim 1, wherein the third step of specifying parallelism strategies for the respective sub-procedures assigned to the GPU using the two-dimensional work-group partition and the one-dimensional work-group partition, respectively, comprises steps of:

31) specifying a global work-group size for all inter-pixel parallelizable sub-procedures;

32) specifying a local work-group size for all inter-pixel parallelizable sub-procedures;

33) specifying a global work-group size for all inter-feature point parallelizable sub-procedures; and 34) specifying a local work-group size for all inter-feature point parallelizable sub-procedures.

5. The method for accelerating a CDVS extraction process based on the GPGPU platform according to claim 4, wherein the global work-group size in step 31) is specified by assuming that the length and width of an octave of the pyramid are w and h, respectively, and then setting an array globalWorkSize[2] that including two integers, causing globalWorkSize[0]=w, globalWorkSize[1]=h;

the local work-group size in step 32) is specified by directly setting an array localWorkSize[2] including two integers, causing that when the size of an octave of the pyramid is 640×480p, then localWorkSize[0]=32 and localWorkSize[1]=32; when the size of an octave of the pyramid is 320×240p, then localWorkSize[0]=32 and localWorkSize[1]=16; when the size of an octave of the pyramid is 160×120p, then localWorkSize[0]=32 and localWorkSize[1]=8; when the size of an octave of the pyramid is 80×60p, when localWorkSize[0]=16 and localWorkSize[1]=4; when the size of an octave of the pyramid is 40×30p, then localWorkSize[0]=8 and localWorkSize[1]=2;

the global work-group size in step 33) is specified by assuming that a total amount of the feature points detected at the feature detection stage is n(n=1, 2, 3, . . . ), and setting an array globalWorkSize[1] including one integer, causing globalWorkSize[0]=n; and the local work-group size in step 34) is specified by directly setting an array localWorkSize[1] including one integer, causing localWorkSize[0]=32.

6. The method for accelerating a CDVS extraction process based on the GPGPU platform according to claim 5, wherein a parallelism execution strategy of the GPU is determined by specifying the set globalWorkSize and localWorkSize as parameters of OpenCL interface clEnqueueNDRangeKernel, and in partitioning a local work-group, 32 is an optimal individual dimension partition of a work-group size.

7. The method for accelerating a CDVS extraction process based on the GPGPU platform according to claim 1, wherein in the third step, a two-dimensional work-group is assigned to respective sub-procedures with pixels as independent operands; and a one-dimensional work-group is assigned to respective sub-procedures with feature points as independent operands.

8. The method for accelerating a CDVS extraction process based on the GPGPU platform according to claim 1, wherein the applying local memory in step 4 comprises the following operations:

41) assigning local memory to the feature points in the one-dimensional work-group;

42) during executing the kernel program, accessing to and updating of descriptors whose feature points include 128 floating points occur over the local memory assigned at step 41); and 43) updating the descriptors in the global memory using the descriptors in the assigned local memory after completing the operation logics of the sub-procedures assigned to the GPU.

9. The method for accelerating a CDVS extraction process based on the GPGPU platform according to claim 1, wherein an input image in the extracting process is a 640×480p JPEG image.

* * * * *